United States Patent [19]

Tremblay

[11] Patent Number: 4,589,186

[45] Date of Patent: May 20, 1986

[54] METHOD OF MAKING SOLAR HEATER

[76] Inventor: Gerald J. Tremblay, 7015 Leighton Way, Orlando, Fla. 32807

[21] Appl. No.: 730,436

[22] Filed: May 6, 1985

Related U.S. Application Data

[62] Division of Ser. No. 577,787, Feb. 7, 1984, Pat. No. 4,519,381.

[51] Int. Cl.⁴ .............................................. B23P 11/00
[52] U.S. Cl. ................................... 29/434; 29/455 R; 29/460; 264/262; 264/46.9
[58] Field of Search ............ 29/460, 455 R; 264/262, 264/261, 46.5, 46.9; 126/425, 438, 424

[56] References Cited

U.S. PATENT DOCUMENTS

| | | | |
|---|---|---|---|
| 3,013,922 | 12/1961 | Fisher | 29/460 UX |
| 3,029,730 | 4/1962 | Parrish et al. | 264/261 X |
| 3,221,089 | 11/1965 | Cotton | 264/261 |
| 3,566,789 | 3/1971 | Hecht | 264/262 X |
| 3,990,914 | 11/1976 | Weinstein | 126/438 X |
| 4,075,304 | 2/1978 | Watson | 264/261 X |
| 4,158,356 | 6/1979 | Wininger | 126/425 X |
| 4,178,913 | 12/1979 | Hutchison | 126/424 |
| 4,194,492 | 3/1980 | Tremblay | 126/425 |
| 4,255,364 | 3/1981 | Talbert | 264/261 X |
| 4,469,938 | 9/1984 | Cohen | 126/425 X |

*Primary Examiner*—Charlie T. Moon
*Attorney, Agent, or Firm*—William M. Hobby, III

[57] ABSTRACT

A solar heating apparatus is disclosed along with a method of making a solar heating apparatus. The apparatus has a frame with a solar collector movably mounted thereto. A solar tracking mechanism moves the solar collector on the frame during daylight hours responsive to differential heating of a plurality of fluid filled containers located on the solar collector. The tracking mechanism includes a rotating mechanism attached between the frame and the solar collector and having a pair of arcuate cylinders therein along with a pair of fixed pistons. The arcuate cylinders are connected to a pair of fluid filled containers or pipes located on the solar collector and partially shaded in different positions to provide a differential fluid pressure between the containers and between the cylinders of the rotating mechanism. The differential fluid pressure rotates one part of the rotating mechanism attached to the solar collector. The method of making a solar heating apparatus includes the steps of forming a pair of curved sheets of metal on either side of curved ribs and a form, then capping the edges of the spaced sheets of metal and injecting an expandable polymer therebetween. The polymer injected between the sheets is expanded and cured. A solar collector tube is next mounted inside the solar collector curved sheets and a transparent cover is placed over the collector. A solar collector rotating mechanism is mounted between a fixed frame and the solar collector and connected to fluid filled containers for rotating the solar collector relative to the differential pressure of the fluid, which pressure varies relative to the position of the sun heating one or more of the containers.

8 Claims, 20 Drawing Figures

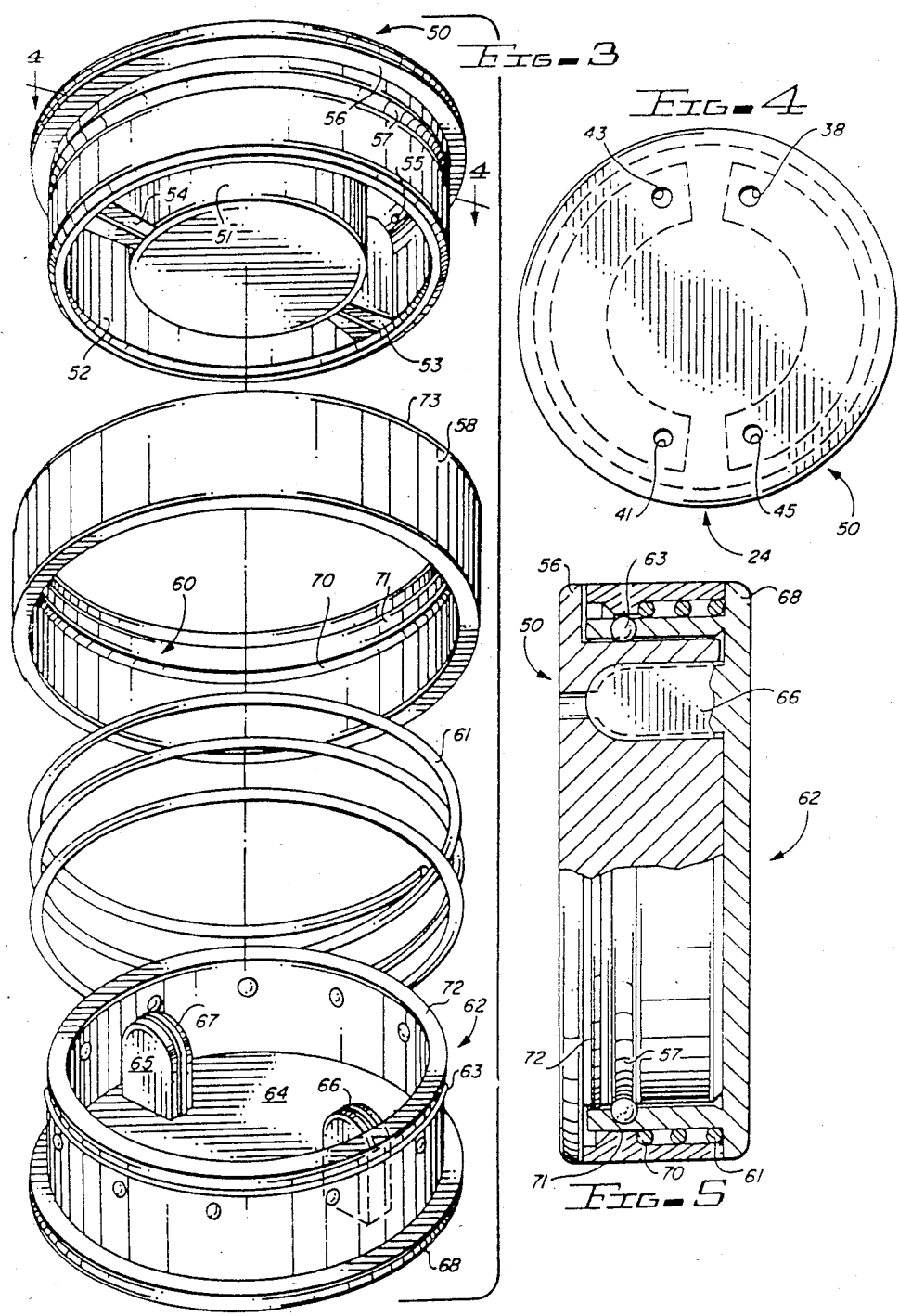

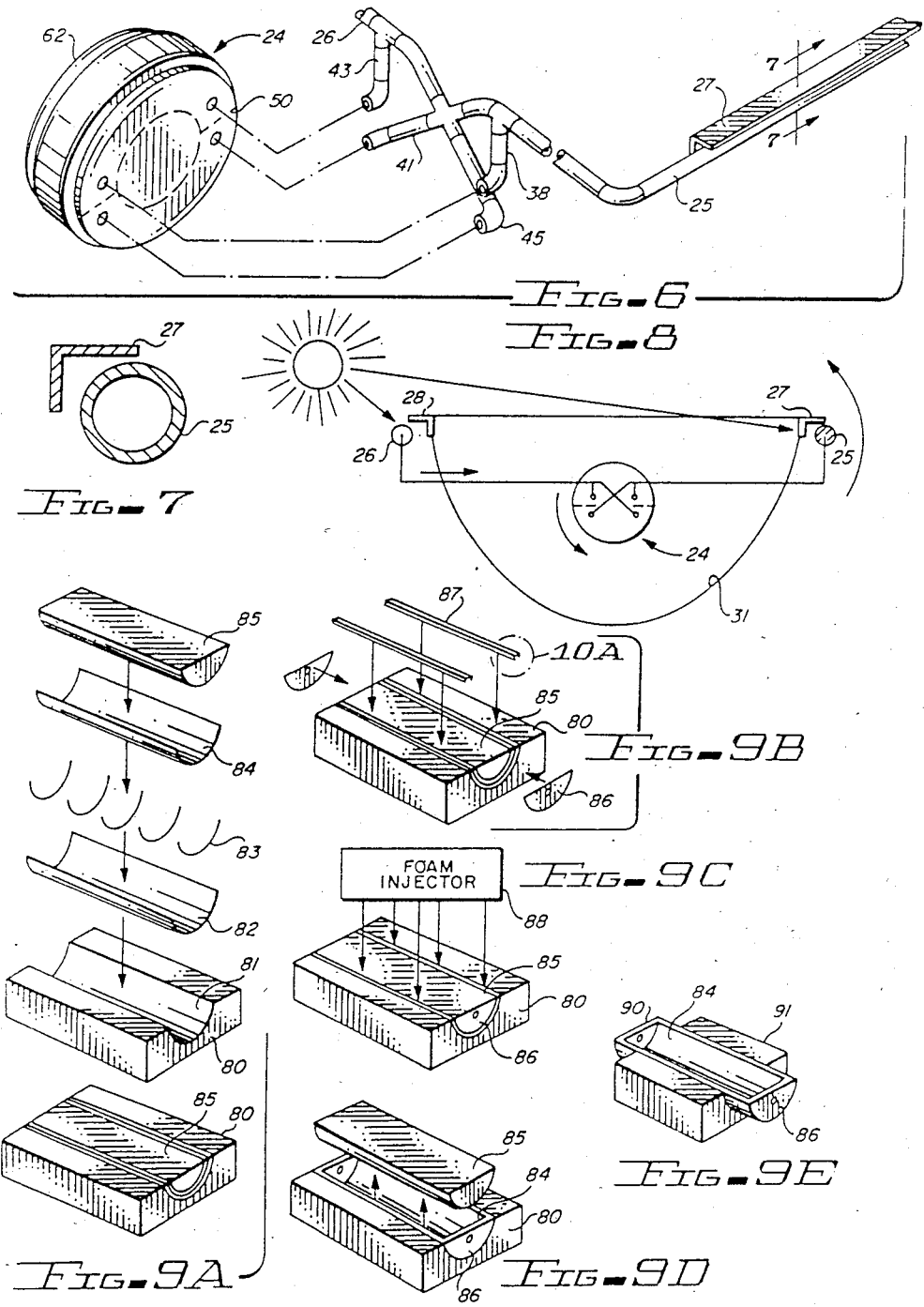

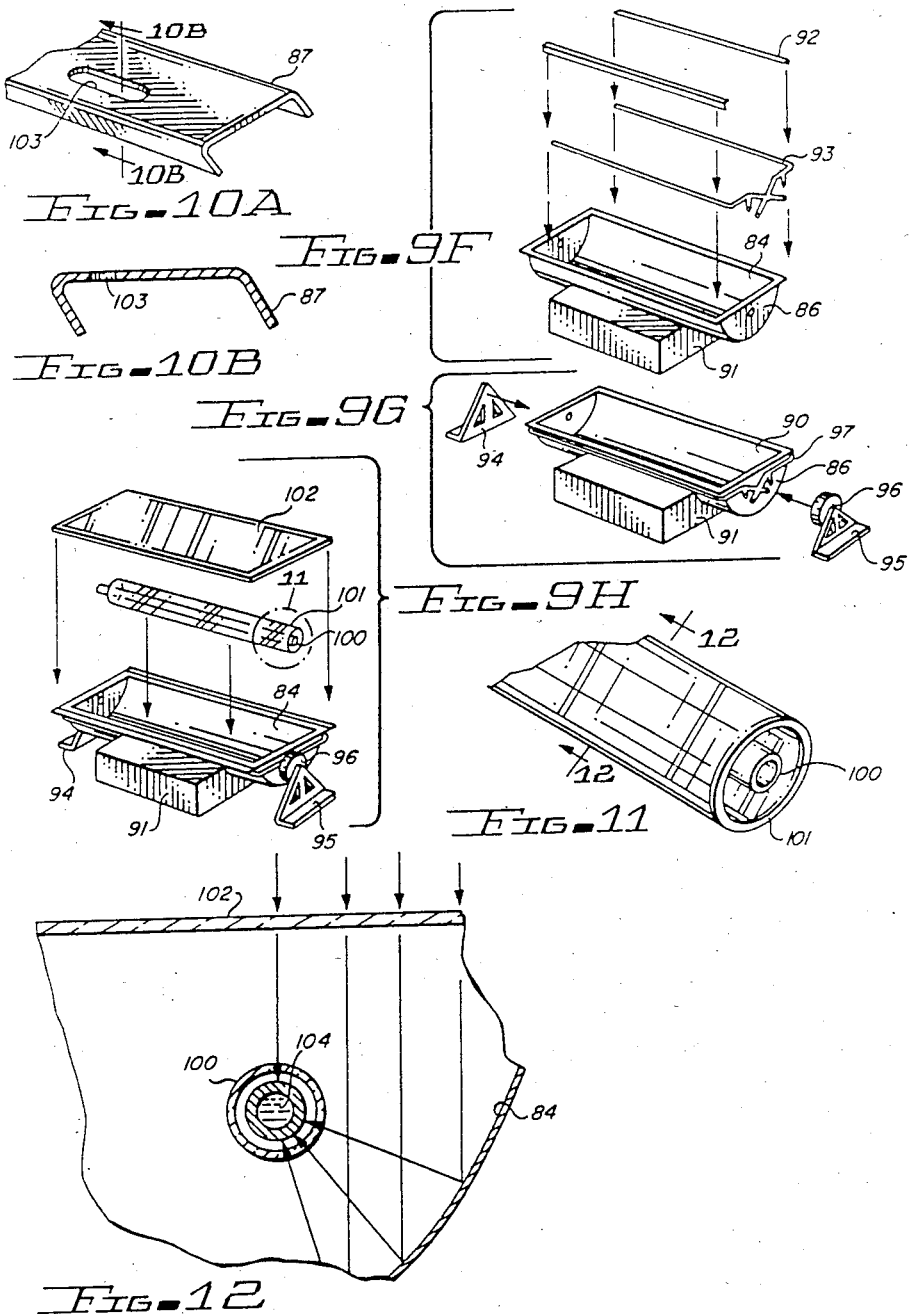

METHOD OF MAKING SOLAR HEATER

This application is a division of U.S. patent application Ser. No. 577,787, filed Feb. 7, 1984, now U.S. Pat. No. 4,579,381, for SOLAR HEATING APPARATUS AND METHOD.

BACKGROUND OF THE INVENTION

The present invention relates to solar heaters and to a method of making solar heaters and especially to solar heaters which concentrate the solar energy hitting the surface of the solar collector and which track the sun during the daylight hours to increase the efficiency of the solar heater.

In the past, a wide variety of solar heaters and solar water heaters have been provided for heating or for providing heat for a variety of purposes. The most common type of prior solar heater probably involves solar panels which are flat panels usually having a serpentine tubing therethrough and a black coating and which may have a transparent cover thereover for heating water passing through the tubing. These solar panels are typically mounted on the top of a building facing south so that the sun will hit the panels during a good portion of the day. The liquid passing through the solar panels may then be collected in a hot water storage tank and used in heating a building or providing hot water for a building. Another common type of solar collector involves those having a parabolic or arcuate surface which, instead of being coated black, is a reflecting surface to reflect the energy hitting the surface against a tube placed on the focal line of a parabolic reflector. The tube can have a liquid passing therethrough and is heated by the sun being reflected directly against the tube. Because of the shape of parabolic collectors, they tend to lose efficiency if in a fixed position because of the sun shading portions of the collector as the earth rotates during the day, positioning the sun in different positions relative to the collector. The obvious solution to this type of solar heater is to provide for the slow rotation of the solar collector so that it follows or tracks the sun, thereby getting the greatest efficiency during daylight hours. This has been accomplished in a number of different ways, including having photocells positioned to recognize the positions of greatest energy to produce a signal in an electrical circuit which can rotate an electric motor for rotating the solar collector to follow the sun.

In my prior U.S. Pat. No. 4,194,492 for a Solar Heating Apparatus, an approximation of the movement of the sun during the day allowed a movement of a parabolic reflector by the gradual flow of a liquid between containers in different positions. It has also been suggested in a number of prior patents to provide solar collectors which attract the sun by positioning partially shaded cylinders or containers which produce a differential pressure in a gas, which can then operate a bellows or cylinder to continue to rotate a reflector directed at the sun responsive to the balancing of the pressure by an equal amount of sunlight hitting each pressurized and partially shaded container.

Typical examples of this prior art can be seen in U.S. Pat. No. 4,185,615 to Bottum for a solar collector structure which has partially shaded cylinders having pressurized gas driving a pair of bellows to rotate a solar collector structure. Similarly, in U.S. Pat. No. 4,275,712 to Baer a sun tracking device employs displaced heating surfaces for automatic morning reorientation. In U.S. Pat. No. 4,178,913 to Hutchinson, a solar collector system is driven by hydraulic cylinders; while the collector in U.S. Pat. No. 4,122,827 is motor driven. In U.S. Pat. No. 4,079,249 to Glenn a solar energy operated motor has a plurality of containers positioned in a variety of positions inside a larger container having a predetermined window allowing light to hit different containers at different times of the day to rotate a solar heater. Similarly, the Snyder U.S. Pat. No. 4,276,122 shows a solar distillation unit capable of working off of solar radiation.

The present solar collector operates on a principle similar to some of those taught in these prior patents by utilizing a pair of containers having a pressurized gas therein and being partially shaded so that the pressure differential is built up between the gases in the containers except when an equal amount of sunlight is hitting each container. The pressure differential then moves the solar collector to continuously align the solar collector with the sun. However, in contrast to the prior art use of bellows, and special shifting mechanism, the present invention uses a simple rotating mechanism adapted to rotate the solar collector on its frame using a pair of arcuate cylinders mounted to a frame and a pair of fixed pistons positioned therein and attached to the solar collector. The fluid from each container is directed into one of the cylinders to rotate the solar collector to track the sun during daylight hours. In addition, the method of making the solar collector in accordance with the present invention allows the solar collector to be made inexpensively for a highly efficient collector.

SUMMARY OF THE INVENTION

A solar heating apparatus is provided which has a frame with a solar collector for collecting and concentrating solar energy movably mounted to the frame. A solar tracking mechanism moves the solar collector on the frame during daylight hours responsive to differential heating of a pair of fluid filled containers located on the solar collector. The fluid filled containers are partially shaded so that the pressure in each of the containers is responsive to the heating of the containers by sunlight and will be aimed at the sun when the pressure is balanced between the two cylinders. The solar tracking mechanism has a rotating mechanism attached between the frame and the solar collector so that one has a pair of arcuate cylinders attached thereto, while the other has at least one piston mounted thereto and positioned in the arcuate cylinders. The pair of fluid filled containers are connected one to each cylinder, so that the pressure differential between the fluid filled containers will create a pressure differential between the arcuate cylinders to force the movement of the solar collector relative to the frame. The solar collector rotating mechanism includes a piston portion, a cylinder portion and a locking collar for locking the two together with the pistons inside the arcuate cylinders so that the unit is adapted for inexpensive manufacture and assembly.

The method in accordance with the present invention provides for the steps of placing a pair of curved metal sheets in a curved form having a plurality of spacing ribs therebetween attaching capping members over the edges of the spaced curved metal sheets in the frame, injecting a foamed polymer between the metal sheets, then removing the collector once the foam polymer has cured. A collector tube, along with an evacuated glass tube, can be attached in the solar collector. Heat sensor cylinders and shadow bars can be attached to the solar collector, as can the rotating mechanism which is attached to one end of a solar collector and to a frame. A transparent cover can be placed over the curved form solar collector and held by capping members.

BRIEF DESCRIPTION OF THE DRAWINGS

Other objects, features and advantages of the present invention will be apparent from the written description and the drawings, in which:

FIG. 3 is an exploded perspective view of a rotating mechanism for the solar collector in accordance with the present invention;

FIG. 4 is an end elevation of the assembled rotation mechanism of FIG. 3;

FIG. 5 is a sectional view of the rotating mechanism in accordance with FIGS. 3 and 4;

FIG. 6 is an exploded perspective view of the rotating mechanism heat sensing pipes;

FIG. 7 is a sectional view taken through one sensor pipe and shadow bar;

FIG. 8 is diagrammatic view of the operation of the solar collector rotation system;

FIGS. 9A through 9H show perspective diagrammatic views of the steps of the process of making a solar collector in accordance with the present invention;

FIG. 10A is a partial perspective view of an end cap used in the solar collector;

FIG. 10B is a sectional view taken on the line 10B of FIG. 10A;

FIG. 11 is a partial perspective view of the collector tube in an evacuated glass tube in accordance with the present invention;

FIG. 12 is a sectional view taken through a portion of the solar collector.

DESCRIPTION OF THE PREFERRED EMBODIMENTS

Figure 1:
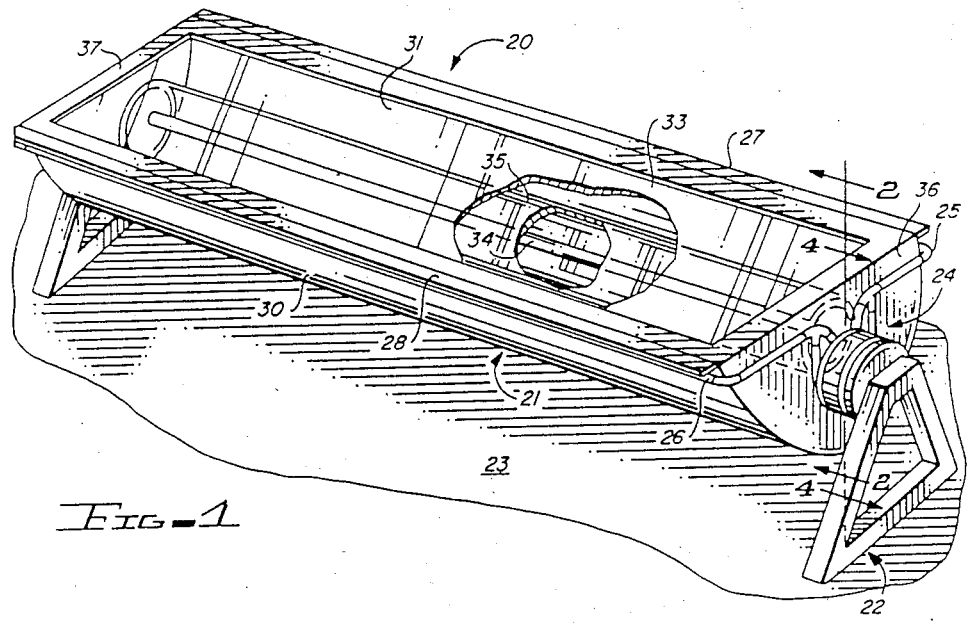
FIG. 1 is a perspective view of a solar collector in accordance with the present invention.

Referring to the drawings and especially to FIGS. 1 through 8, a solar collector system 20 is shown having a solar collector 21 movably attached to a fixed frame 22 which is positioned on a surface 23. The solar collector 21 and frame 22 are connected with a solar collector rotating mechanism 24 on one end of the solar collector 21 and is mounted with a bearing on the other end of the solar collector 21. A pair of containers or tubes 25 and 26 are mounted along each side of a solar collector 21 and are partially shaded by shadow bars 27 and 28 mounted to the edge of the solar collector 21. The solar collector 21 has a curved or parabolic outer surface 30 and a curved or parabolic reflector surface 31 on the inside thereof and has capping members 32 along the edge and a transparent surface cover, such as a glass plate 33. Mounted inside the collector 21 is a collector tube 34 surrounded by an evacuated glass tube 35 so that the heat directed against the collector tube 34 by the shiny reflecting surface 31 which may be a mirrored metal surface with a collector pipe 34 mounted along the focal axis of the curved plate 31. Sunlight directed against the collector tube 34 is directed through the evacuated glass tube 35, which creates a more efficient utilization of the reflected solar energy. The fluid filled containers or pipes 25 and 26 are connected to the rotating mechanism 24 and rotate the solar collector 21 responsive to the pressure differentials between the fluid and the pipes. The fluid may be a compressed freon gas, for instance, and will generate a pressure depending upon the heat applied to the tubes 25 or 26, which is dependent upon sunlight hitting each tube which is partly shaded by shadow bars 27 and 28. When the sun is equally hitting each tube 25 and 26, the solar collector 21 should be aimed directly at the sun. The pressure differential is applied to a pair of arcuate cylinders located in the rotating mechanism 24 which apply the pressure against a pair of pistons in the arcuate cylinders which are attached to the collector 21 so that the pistons are driven by the pressure differential to force the collector 21 to rotate until the pressures are balanced.

Figure 2:
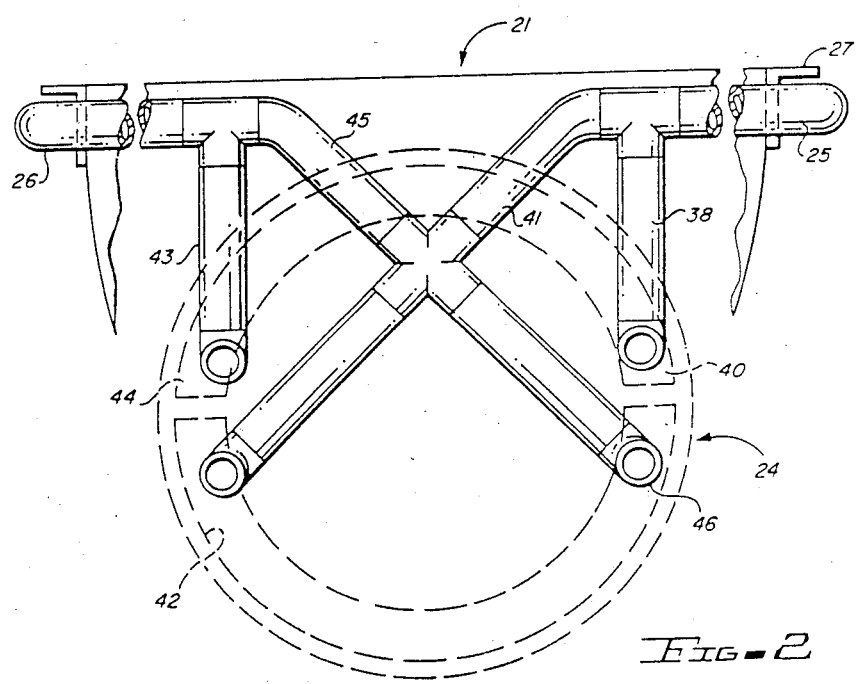
FIG. 2 is a sectional view taken on the line 2—2 of FIG. 1.

As seen in FIG. 2, the collector 21 has end plates end 36 and 37 on the ends thereof and has a tube or container 25 connected with a pipeline 38 into one cylinder 40 of the rotating mechanism 24 and a second pipe 41 connected into a cylinder 42, while the pipe 26 has a pipe 43 connected into a cylinder 44 and a second pipe 45 connected into a cylinder 46 to create a pressure differential on opposite sides of two pistons.

The rotating mechanism 24 is more clearly seen in connection with FIGS. 3, 4 and 5 in which a rotation cup 50 has an arcuate chamber 51 and an arcuate chamber 52 divided by fixed walls or pistons 53 and 54. The cylinder cup has a pair of inlet ports 55 on either side of the fixed walls or pistons 53 and 54. The walls 53 and 54 are separating walls between the chambers 51 and 52. The rotating cup 50 has an annular flange 56 and an annular groove 57 therearound and fits through a locking collar 58 having an annular groove 60 thereinside. The locking collar 58 has a locking spring 61 that fits thereinside, and which there in turn, fits inside the piston cup 62. The piston cup has a plurality of ball detents 63 mounted through openings therein and has a hollow cylindrical interior with a bottom 64 and a pair of pistons 65 and 66 mounted so that they fall within the cylinders 51 and 52. Each piston 65 and 66 has a seal 67 formed thereon and the piston cup 62 has a flanged surface 68.

The assembled view as shown in FIG. 4 thereby divides the arcuate cylinders 51 and 52 into four separate chambers with each of the pistons 65 and 66 falling between the chamber walls 53 and 54, so that each piston 65 and 66 has a chamber on the opposite side thereof connected to tubes 25 and 26 to thereby create a pressure differential between the pressures in the pipes 25 and 26 on either side of the pistons 65 and 66.

The unit is assembled as shown in FIGS. 4 and 5 by the cylinder cup 50 being inserted through the locking collar 58 with the spring 61 being inserted inside the locking collar against an annular grooved surface 70. The spring 61 fits on the outside of the piston cup 62, as does the locking ring 58, while the cylinder cup 50 slides inside the piston cup cylinder 62. The ball detents 63 are forced by the locking collar 58 to lock into the grooves 57 of the cylinder cup 50 by the annular ledge 71 pushing against the ball detents when they get to a fully closed locking position. A seal 72 provides a seal against the leakage of gas, while the locking collar is held in place by the flange 56 pushing down on the top ledge 73 of the locking collar, which in turn has the annular ledge 71 pushing against the ball detent 63 pushing them into the groove 57. In the assembled form, four arcuate cylinders are formed having two movable pistons and two fixed pistons or walls. A pressure differential across each movable piston allows the piston to move and thereby move the piston cup to thereby move an attached solar collector 21 responsive to a pressure differential between the gases on each side of the two pistons.

FIG. 8 shows in diagrammatic form how the shadowed containers or pipes allow differing amounts of sun to hit each container to thereby increase the temperature in one pipe relative to the other to thereby create a pressure differential in the gases in each pipe. The gas in each pipe is then directed to opposite sides of two different pistons, which creates a pressure differential across the pistons when the pressure differential appears across the shadowed containers to continuously align the solar collector with the direction of the sun.

It should be clear at this point that a solar collector has been provided which is adapted to rotate on a frame and which has a rotating mechanism adapted to rotate the solar collector to make it track the sun during daytime hours. The solar collector, however, is made through a method which allows it to be economically produced to provide an efficient solar heating unit.

The process of producing a solar heater is illustrated in FIGS. 9A through 9H and includes the use of a form 80 having a curved or a parabolic surface 81 formed thereon for inserting a pre-cut, pre-sized and pre-rolled sheet of metal 82 with pre-formed ribs of a foamed polymer material 83 placed on the sheet of metal 82. A second parabolic sheet of pre-cut, pre-sized and pre-rolled metal 84 is placed over the ribs 83 and a preformed make form 85 having a parabolic surface similar to the surface on the reflecting surface 84 is inserted therein. Once the sheet 82, ribs 83 and sheet 84 are in place in the form 80, a pair of end pieces 86 are attached to the end connecting the ends of the sheets 82 and 84 and a pair of foam insertion seals and capping members 86 are placed along the top edge of the sheets 84 and 82 connecting the sheets together, but having openings in the capping members 86, as shown in FIG. 9B.

In FIG. 9C an expandable polymer is injected through the openings in the caps 86 between the sheets 82 and 84 and between the ribs 83 and allowed to expand and cure. The foam polymer injectors 88 are shown in FIG. 9C. Once the foam has cured, the male form 85 is removed and the solar collector unit 90 is placed in a working form 91, as shown in FIG. 9E. While sitting on the working form, the shadow bars 92 can be attached along with the containers or pipes 93, as shown in FIG. 9F. Frame members 94 and 95 can be attached as shown in FIG. 9G with the frame 95 having the rotating mechanism 96 already attached thereto for attachment to the pipe ends 97. Solar collector 90 has a collector tube 100 mounted therein and placed inside an evacuated glass cylinder 101, which has a partial vacuum therein around the tube 100. The collector tube is mounted to the two ends 86 and a transparent glass or polymer cover 102 is mounted on the solar collector 90 to prevent the mirrored surface 84 from becoming dirty and reducing its efficiency. The unit can then be removed from the working form 91.

The process includes the steps of setting up the pre-cut, pre-sized, pre-rolled sheets of metal 82 and 84 along with the ribs 83 in the form 80 and placing the male form 85 therein. This is followed by the step of placing the end caps 86 thereonto and the top caps of 87 and foam injecting the space between the plates 82 and 84, removing the foam collector and placing it on a working form where the shadow bars and heat sensor pipes are mounted thereto. The solar collector is mounted to the frame with the rotating mechanism mounted on one end. The collector tube is mounted, as well as the evacuating tube, and a glass cover mounted directly over the unit. The heat sensor pipes or cylinders must then be charged and the unit is ready for installation.

FIGS. 10A and 10B show the cap members 87 of FIG. 9 for connecting plates 82 and 85 and having openings 103 therein for the injection of the foamed polymer, as shown in FIG. 9C. FIG. 11 shows the collector tube 100 of FIG. 9H having the evacuated glass tube 101 therearound, while FIG. 12 shows the collector tube 100 having a liquid 104 therein with the transparent glass tube 101 mounted therein beneath the glass cover 102, with the arrow showing the direction of the sunlight bouncing off of the parabolic reflector 84.

It should be clear at this point that a solar collector and a method of making a solar collector have been provided which attract the sun during the daylight hours and without having to have a power source other than solar energy for the rotation of the solar collector. It should, however, be clear that the present invention is not to be limited to the forms shown which are to be considered illustrative rather than restrictive.

I claim:

1. A method of making a solar heating apparatus comprising the steps of:
    forming a pair of pre-cut, pre-sized rectangular sheets of metal having longitudinal edges and end edges in a curved form with a predetermined space therebetween;
    capping the end edges of said spaced sheets of metal to form a closed end trough structure;
    injecting an expandable polymer material between said spaced curved sheets;
    expanding and curing said injected polymer material between said spaced curved sheets; and
    mounting a solar collector tube between said end caps in the trough structure of in said solar collector formed by said spaced sheets of metal, whereby a rapidly formed solar collector is produced.

2. A method of making a solar heating apparatus in accordance with claim 1 in which the step of capping includes capping the end edges of spaced sheets with a capping having apertures therein.

3. A method of making a solar heating apparatus in accordance with claim 1 including the step of encasing the solar collector tube in a transparent cover tube.

4. A method of making a solar heating apparatus in accordance with claim 2 including the step of evacuating the transparent cover of tube of air.

5. A method of making a solar heating apparatus in accordance with claim 4 including the step of mounting a collector rotating means between a frame and said solar collector.

6. A method of making a solar heating apparatus in accordance with claim 4 including the step of mounting a pair of partially shaded fluid filled containers adjacent said solar collector and to said rotating means.

7. A method of making a solar heating apparatus in accordance with claim 5 including the step of making said rotating means by connecting a casing member having a pair of arcuate cylinders therein to a casing member having a pair of pistons attached thereto.

8. A method of making a solar heating apparatus in accordance with claim 6 including the step of covering said formed solar collector with a transparent cover.

* * * * *